July 15, 1958 R. A. POWELL 2,842,854
COMPARATOR HAVING FINE ADJUSTMENT BY FRAME DISTORTION
Filed Dec. 15, 1954
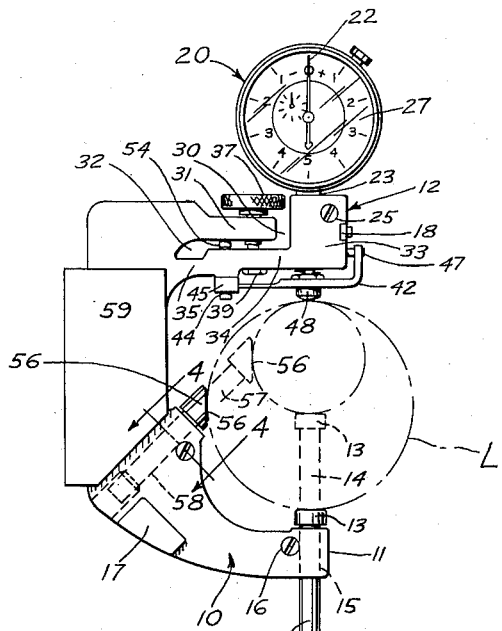
Fig. 1
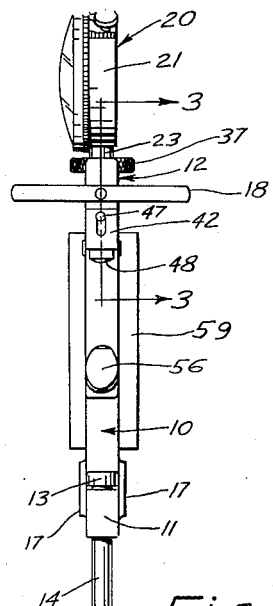
Fig. 2
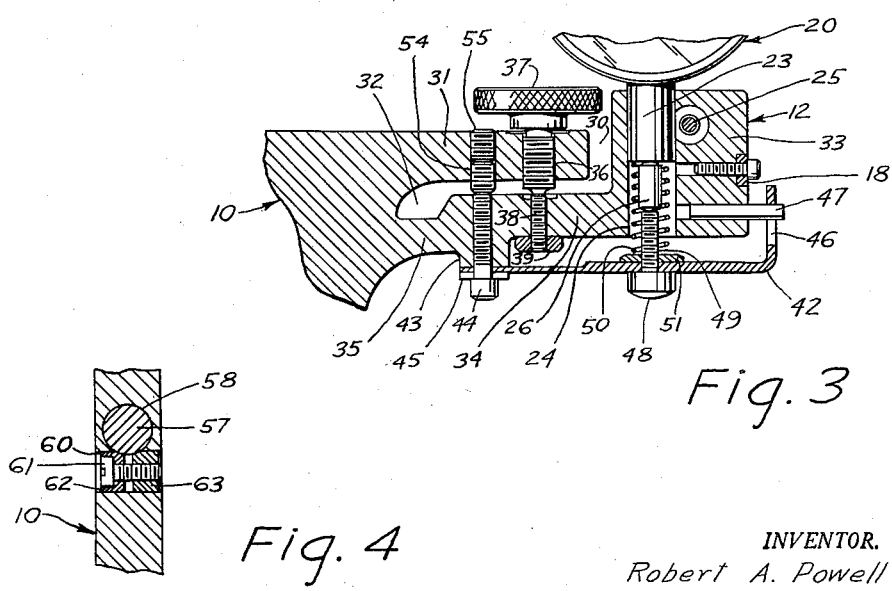
Fig. 3
Fig. 4
INVENTOR.
Robert A. Powell
BY
Albert P. Davis United States Patent Office 2,842,854
Patented July 15, 1958

2,842,854

COMPARATOR HAVING FINE ADJUSTMENT BY FRAME DISTORTION

Robert A. Powell, Providence, R. I., assignor, by mesne assignments, to Sealol Corp., Warwick, R. I., a corporation of Delaware Application December 15, 1954, Serial No. 475,379

8 Claims. (Cl. 33—147)

The present invention relates to a gage and more particularly relates to a snap gage adaptable to measure objects of different size and which is provided with a fine adjustment mechanism permitting the quick and accurate setting of the parts thereof.

Snap gages are extensively used in manufacturing operations to quickly and accurately check the outside dimensions of work-pieces. The prior art snap gages are comprised of a yoke-like frame having an anvil on one side opposed on the other side by a dial indicator, and a backstop member in the middle of the yoke to locate a work-piece between said anvil and the stem of the indicator. The anvil is usually mounted for movement towards and away from the indicator stem to permit a predetermined distance to be pre-set between said anvil and indicator stem. The backstop also is movable towards and away from the open end of the yoke. It is highly desirable that the anvil be so located with respect to the indicator stem that a work-piece having exactly the predetermined dimension will, when placed between the anvil and indicator stem, move said stem a sufficient distance to position the indicator hand on the zero graduation of its dial. When the gage is thus adjusted work pieces can be inspected therewith and the amount they differ from the predetermined dimension can be read directly on the indicator dial. However, such accurate adjustment of the anvil position has been extremely difficult to obtain due to the extreme sensitivity of the indicator.

Furthermore, with the prior art gages, the backstop is at the mid-point between the anvil and indicator stem only when the anvil is in its most remote position with respect to said stem. As said anvil is moved towards the indicator stem it approaches the backstop thus placing said backstop off center which obviously is a serious disadvantage when work pieces having a circular cross-section are to be measured.

One object of the present invention is to provide an adjustable snap gage having a fine adjustment mechanism permitting the rapid and accurate setting of the instrument to place the indicator hand at any predetermined graduation on the indicator dial.

Another object of the present invention is to provide an adjustable snap gage having an adjustable anvil capable of extended movement, a dial indicator, and a fine adjustment mechanism for accurately and rapidly moving said anvil and indicator relative to each other through a limited range of movement.

Another object of the present invention is to provide adjustable means for mounting a measuring instrument on a snap gage frame.

Another object of the present invention is to provide an adjustable snap gage having a dial indicator and an anvil capable of movement relative to each other and a backstop for positioning a work piece between said anvil and indicator, said backstop being adapted to be positioned midway between said anvil and the work piece contacting stem of said indicator regardless of the relative positions of said anvil and indicator.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

For a further understanding of the nature and objects of the invention, reference should be had to the following detailed description taken in connection with the following drawing wherein:

Figure 1 is a side view of the snap gage of the present invention;

Fig. 2 is an end view thereof;

Fig. 3 is a fragmentary sectional view taken on the line 3—3 of Fig. 2, drawn to an enlarged scale and showing details of the fine adjustment mechanism; and Fig. 4 is a fragmentary sectional view taken on the line 4—4 of Fig. 1, drawn to an enlarged scale and showing details of the means for adjustably clamping the anvil.

A preferred embodiment of the present invention comprises a generally C-shaped frame having an anvil mounted on one extremity for extended adjusting movement relative to an indicator mounted on the other extremity of the frame. The indicator is mounted for limited movement relative to said anvil by means of a fine adjustment mechanism that includes a portion of said frame movable relative to the major part thereof, and means for moving said portion through small increments. A backstop is adjustably carried by said frame for movement along a line forming an acute angle with a line joining said indicator and anvil, so that said backstop can be positioned intermediate the work piece containing part of said indicator and said anvil regardless of their relative positions.

The embodiment of the present invention shown comprises a generally C-shaped yoke or frame 10, preferably made of metal, having a lower extremity 11 and an upper extremity 12. An anvil 13, fixed to one end of a rod or shaft 14, is adjustably carried by lower extremity 11 by reason of rod 14 being slidably carried in bore 15 in said extremity 11. A clamping screw 16, to be explained in detail hereinafter, is provided to lock rod 14 and anvil 13 in any predetermined setting.

A dial indicator 20 is fixedly carried by extremity 12 by means of indicator mounting neck 23 which is clamped in bore 24 by clamping screw 25. The case or housing 21 of indicator 20 is secured to neck 23 and projects above extremity 12 and contains the usual motion amplifying linkage, not shown, that moves indicating hand 22 over the calibrated dial 27 in response to axial movement of the indicator stem 26, all in the manner old and well known in the art. The two bores 15 and 24 are in axial alignment with each other and as a result indicator stem 26 is in alignment with the center of anvil 13. Clamping screw 25 is similar to clamping screw 16.

Extremity 12 is an L-shaped member 33, 34 that is set off from the major part of frame 10 by L-shaped slot 30 that terminates in an enlarged opening 32. The portion of frame 10 adjacent opening 32, and which connects L-shaped member 33, 34 to said frame, is relatively thin, as indicated at 35, to provide a resiliently flexible connection for a purpose that will become more apparent hereinafter. A relatively rigid finger 31 extends substantially parallel to leg 34 of extremity 12 on the other side of slot 30. An opening 36 is provided in finger 31 adjacent its ends and thumb screw 37 is threadedly engaged in said opening. The end of thumb screw 37 extends across slot 30 and engages the upper end of hardened screw 38 which is threadedly engaged in an opening extending through leg 34. A lock nut 39 is threaded on the lower end of screw 38 to engage the lower surface of leg 34 to lock said screw in position. As thumb screw 37 is screwed downwardly its lower end first engages the end of hardened screw 38, which provides a hard, wear resistant abutment therefor, and continued downward movement of screw 37 swings extremity 12 downwardly away from finger 31 around the flexible connection 35. Such downward movement of extremity 12 carries indicator 20 toward anvil 13 and since the threads carried by screw 37 and opening 36 can be of very fine pitch it will be seen that said indicator can be moved relative to said anvil in very fine increments. Movement of screw 37 upwardly permits leg 34 and extremity 12 to swing upwardly under the influence of resilient connection 35.

A resilient reed 42 is fixed at one of its ends to boss 43, formed adjacent the end of leg 34, by means of screw 44 and yoke-shaped washer 45. Screw 44 extends upwardly through leg 34 and terminates adjacent its upper surface. The other end of reed 42 is up-turned and extends upwardly past the lower part of leg 33. A vertical slot 46 is formed in said upturned end and is slidably engaged over a pin 47 projecting outwardly from said leg 33. A work-piece contacting button 48 is fixed to reed 42 in alignment with indicator stem 26 by means of threaded shank 49 which is in engagement with said indicator stem. A helical spring 50 surrounds stem 26 and shank 49 having one of its ends in engagement with mounting neck 23 and its other end engaging shank securing nut 51 to urge reed 42 away from leg 34. A loading screw 54 is threadedly engaged in an opening formed in finger 31 in alignment with screw 44. Loading screw 54 is screwed downwardly to engage its end with the end of screw 44 and to thereby deflect extremity 12 downwardly a slight amount to thereby constantly maintain a flexing load on the resiliently flexible connection 35 when it is not under load from thumb screw 37. A locking screw 55 is provided behind screw 54 to lock said screw 54 in its adjusted position.

The apparatus thus far described functions in the following manner. When a work-piece L is placed between anvil 13 and button 48 said work piece will move said button upwardly flexing reed 42 and causing shank 49 to move indicator stem 26 upwardly. If the work-piece has the predetermined desired dimension indicator hand 22 will come to rest at the 0 position on dial 27. If the work-piece is under or over size the hand will indicate the amount the piece is over or under size.

When it is desired to reset the apparatus to gauge a work-piece of different size, clamping screw 16 is loosened and anvil 13 is moved towards or away from indicator 20, as the case may be, until a work-piece having precisely the desired dimension will move indicator stem 26 a slight amount or will avoid touching button 48 by a slight amount. This is a rough adjustment that can be made very rapidly. Clamping screw 16 is then tightened to lock anvil 13 in position. With the standard work-piece still between anvil 13 and button 48 thumb screw 37 is turned to move extremity 12, indicator 20, button 48 and reed 42 towards or away from anvil 13 until hand 22 rests on the 0 position on the indicator dial.

A back stop 56 is provided to locate the work-pieces being inspected between anvil 13 and button 48. Back stop 56 is carried by one end of a rod or shaft 57 that is adjustably carried in a bore 58 provided in frame 10. Bore 58 is in the same plane as bores 15 and 24 but makes an angle of substantially 45 degrees to their center line. Furthermore, the uppermost edge of bore 58 is substantially in alignment with the innermost edge of button 48. It will therefore be seen that by sliding rod 57 in or out of bore 58 back stop 56 can be positioned midway between and behind button 48 and anvil 13.

Rods 14 and 57 and indicator mounting neck 23 are all adjustably secured in their respective bores by similar clamping devices. Fig. 4 is a cross-section through the clamping device employed with rod 57, but it will be understood that the following description of it also applies to clamping screws 16 and 25. A hole 60 extends through frame 10 and breaks through one side of bore 58. Clamping screw 61 passes through plug 62 slidably carried in hole 60 and threadedly engages plug 63 also slidably carried in said hole. The facing ends of plugs 62 and 63 are chamfered to fit around rod 57. When screw 61 is loosened plugs 62 and 63 can separate and rod 57 is free to move in or out of bore 58. When screw 61 is tightened said plugs are drawn together to wedge said rod against the wall of bore 58.

A hand piece 59, preferably made of wood but which may be any other material that has good heat insulating properties, encloses the mid-section of frame 10. Hand piece 59 is a convenient member to grasp when an operator is using the instrument and its heat insulating properties prevent body heat from being transmitted to and expanding frame 10.

Frame 10 is provided with a pair of opposed bosses 17 beneath hand piece 59 that serve as clamping pads to be gripped by a vise in the event it is desired to support the instrument in a fixed position. A cross bar 18 is screwed to the face of leg 33 to serve as a support when the instrument is layed down to prevent injury to dial indicator 20 from contact with a table or bench.

Since certain changes may be made in the above apparatus without departing from the scope of the invention herein involved, it is intended that all matter contained in the above description or shown in the accompanying drawing shall be interpreted as illustrative and not in a limiting sense.

What is claimed is:

1. A gage for checking a dimension of a work-piece comprising a C-shaped frame having a pair of opposed spaced apart extremities, a first one of said extremities being a rigid portion of said frame and the second extremity being resiliently connected thereto, an indicator and an anvil being carried in opposed relationship by said extremities, a substantially rigid finger on said frame and adjacent said second extremity, and means cooperating with said finger and said second extremity to move said second extremity relative to said first extremity whereby said indicator and anvil are moved relative to each other.

2. A fine adjustment mechanism for mounting a measuring instrument comprising a frame, an extremity on said frame integral therewith and connected thereto by a resiliently flexible length, means carried by said extremity to secure a measuring instrument thereto, a substantially rigid finger extending from said frame adjacent a portion of said extremity, and means cooperating with said finger and extremity to move said extremity relative to said finger and frame.

3. A fine adjustment mechanism for mounting a measuring instrument comprising a frame, an extremity on said frame integral therewith and connected thereto by a resiliently flexible length, means on said extremity for securing a measuring instrument thereto, a substantially rigid finger extending from said frame adjacent a portion of said extremity, and an adjusting screw cooperating with said finger and extremity to selectively increase or decrease the spacing between said finger and extremity.

4. A fine adjustment mechanism for locating a measuring instrument relative to a reference surface comprising a frame, an extremity connected to said frame by a resiliently flexible length, means on said extremity for securing a measuring instrument thereto, a substantially rigid finger extending from said frame adjacent a portion of said extremity, an adjusting screw cooperating with said finger and extremity and operative when rotated in one direction to flex said length to move said extremity away from said finger and when rotated in the other direction to permit the resilience of said length to move said extremity toward said finger, and adjustable means for placing a predetermined load on said length when said adjusting screw is inoperative.

5. A fine adjustment mechanism as set forth in claim 4 wherein said adjusting screw is threadedly engaged in said finger and contacts said extremity.

6. A fine adjustment mechanism as set forth in claim 4 wherein said adjustable means is a screw threadedly engaged in said finger and which contacts said extremity.

7. A fine adjustment mechanism as set forth in claim 5 wherein said adjustable means is a screw threadedly engaged in said finger and which contacts said extremity.

8. A fine adjustment mechanism for mounting a measuring instrument comprising a frame, an extremity on said frame integral therewith and connected thereto by a resiliently flexible length, a dial indicator having a movable stem mounted on said extremity, a substantially rigid finger extending from said frame adjacent a portion of said extremity, means cooperating with said finger and extremity to move said extremity relative to said finger and frame, and a resilient reed fixed to said extremity and movable therewith, said reed being movable relative to said extremity by a work-piece to operate said indicator stem.

References Cited in the file of this patent

UNITED STATES PATENTS

| | | |
|---|---|---|
| 1,436,656 | Horstmann et al. | Nov. 28, 1922 |
| 1,648,895 | Gerdien | Nov. 15, 1927 |
| 2,307,831 | Emery | Jan. 12, 1943 |
| 2,468,362 | Fournier | Apr. 26, 1949 |
| 2,560,203 | Aldeborgh | July 10, 1951 |
| 2,580,009 | Emery | Dec. 25, 1951 |